US005442555A

United States Patent [19]
Reifman et al.

[11] Patent Number: 5,442,555
[45] Date of Patent: Aug. 15, 1995

[54] COMBINED EXPERT SYSTEM/NEURAL NETWORKS METHOD FOR PROCESS FAULT DIAGNOSIS

[75] Inventors: Jaques Reifman, Westchester; Thomas Y. C. Wei, Downers Grove, both of Ill.

[73] Assignee: Argonne National Laboratory, Argonne, Ill.

[21] Appl. No.: 132,888

[22] Filed: Oct. 7, 1993

Related U.S. Application Data

[63] Continuation-in-part of Ser. No. 885,132, May 18, 1992, Pat. No. 5,265,035.

[51] Int. Cl.[6] .................. G06F 15/48; G06F 15/50; G06F 15/46
[52] U.S. Cl. .................. 364/431.01; 364/551.01; 364/495; 364/494; 376/215; 376/217; 376/255; 395/915
[58] Field of Search .................. 364/551.01, 495; 376/215, 267, 433, 245, 217, 255; 395/915

[56] References Cited

U.S. PATENT DOCUMENTS

| | | |
|---|---|---|
| 4,644,479 | 2/1987 | Kemper et al. |
| 4,853,175 | 8/1989 | Book, Sr. |
| 4,967,337 | 10/1990 | English et al. |
| 5,081,598 | 1/1992 | Bellows et al. |
| 5,089,978 | 2/1992 | Lipner et al. |
| 5,099,436 | 3/1992 | McCown et al. |
| 5,116,567 | 5/1992 | Fennern .................. 376/433 |
| 5,122,976 | 6/1992 | Bellows et al. |
| 5,132,920 | 7/1992 | Bellows et al. |
| 5,133,046 | 7/1992 | Kaplan. |
| 5,204,053 | 4/1993 | Fennern .................. 376/267 |
| 5,265,035 | 11/1993 | Reifman et al. .................. 364/551.01 |
| 5,309,485 | 5/1994 | Chao .................. 376/215 |

Primary Examiner—Emanual T. Voeltz
Assistant Examiner—Alan Tran
Attorney, Agent, or Firm—Emrich & Dithmar

[57] ABSTRACT

A two-level hierarchical approach for process fault diagnosis is an operating system employs a function-oriented approach at a first level and a component characteristic-oriented approach at a second level, where the decision-making procedure is structured in order of decreasing intelligence with increasing precision. At the first level, the diagnostic method is general and has knowledge of the overall process including a wide variety of plant transients and the functional behavior of the process components. An expert system classifies malfunctions by function to narrow the diagnostic focus to a particular set of possible faulty components that could be responsible for the detected functional misbehavior of the operating system. At the second level, the diagnostic method limits its scope to component malfunctions, using more detailed knowledge of component characteristics. Trained artificial neural networks are used to further narrow the diagnosis and to uniquely identify the faulty component by classifying the abnormal condition data as a failure of one of the hypothesized components through component characteristics. Once an anomaly is detected, the hierarchical structure is used to successively narrow the diagnostic focus from a function misbehavior, i.e., a function oriented approach, until the fault can be determined, i.e., a component characteristic-oriented approach.

14 Claims, 5 Drawing Sheets

COMBINED EXPERT SYSTEM/NEURAL NETWORKS METHOD FOR PROCESS FAULT DIAGNOSIS

CONTRACTUAL ORIGIN OF THE INVENTION

United States Government has rights in this invention pursuant to Contract No. W-31-109-ENG-38 between the U.S. Department of Energy and The University of Chicago representing Argonne National Laboratory.

CROSS-REFERENCE TO RELATED APPLICATION

This application is a continuation-in-part application of co-pending application Ser. No. 885,132, filed May 18, 1992, now U.S. Pat. No. 5,265,035.

FIELD OF THE INVENTION

This invention relates generally to the analysis and diagnosis of an operating system and is particularly directed to a method for detecting and identifying faulty components in an operating system such as a nuclear power plant.

BACKGROUND OF THE INVENTION

Knowledge representation for process diagnosis expert systems has evolved from simple rule-based systems, known as shallow knowledge, to more complex model-based systems, or deep knowledge. Shallow knowledge represents the domain information through a set of "if . . . then" rules. These rules are generally acquired from a domain expert based on experience and judgmental knowledge with no functional representation of the underlying phenomena. The weakness of rule-based systems is one of verification and validation. Procedures cannot be developed to test heuristically generated rules for correctness and completeness. Even if the diagnostic rules are generated in a systematic fashion, diagnostic event-based rules cannot guarantee functional completeness. It is simply not possible to anticipate and formulate rules to cover every conceivable system situation. Deep knowledge represents the domain information through mathematical models of the process under consideration. This model-based system in the form of quantitative and qualitative simulation algorithms describes the underlying phenomena of the physical system.

To alleviate the limitations of rule-based systems, attempts have been made to combine both shallow and deep knowledge as the knowledge structure of a process diagnostic expert system. One approach is to use shallow rules to hypothesize about the possible failures first, then follow with deep knowledge reasoning to test each one of the hypotheses. The success of this approach is highly dependent on the ability of the shallow rules, which cannot in general be verified and validated, to hypothesize correct faulty candidates.

The present invention addresses and overcomes the aforementioned limitations of the prior art by providing a method of diagnosing failures in the operation of a process by identifying faulty component candidates of process malfunctions through basic physical principles of conservation, functional classification of components, component characteristics and information from the process schematics. Except for the information from the process schematics, the method is completely general and independent of the process under consideration. In contrast to the prior art heuristic construction of a rigid knowledge base that uses an event-oriented approach for process diagnosis, the present invention employs the systematic construction of a hierarchical structure knowledge base with two levels, where the first level is function-based and the second level is component characteristic-based.

OBJECTS AND SUMMARY OF THE INVENTION

Accordingly, it is an object of the present invention to provide a method for diagnosing failures in the operation of a process carried out by a number of components.

It is another object of the present invention to provide a method for the diagnosis of faulty components in an operating system carrying out a process through the macroscopic balance equations of mass, momentum and energy with the equation of state in thermal hydraulic control volumes associated with each process component.

Yet another object of the present invention is to provide for process diagnosis through the generation of a database for the functional classification of each component type as a source or sink of mass, momentum and energy and also through the information of the physical location of the various components carrying out the process as another independent database.

A further object of the present invention is to provide for the verification and validation of the rules for diagnosing a process in terms of the various components carrying out the process which is not dependent upon a multiplicity of rules where the accuracy and completeness are generally uncertain.

A still further object of the present invention is to provide a diagnostic method particularly adapted for use with nuclear power plants, but which may also be applied to virtually any other type of thermal-hydraulic process carried out by a plurality of components.

Another object of the present invention is to provide a diagnosis method for an operating thermal-hydraulic system comprised of various components which provides an analysis based on basic physical principles that reduces the number of possible rules to a small and verifiable knowledge base and which does not rely on an extensive set of an unverifiable set of rules.

It is yet another object of the present invention to provide for the analysis of the operation of a thermal-hydraulic system by identifying a component malfunction with respect to imbalances in the conservation of mass, momentum and energy and which relates unusual changes in these factors with appropriate component functionality.

Another object of the present invention is to provide a computer-based diagnostic method using artificial intelligence techniques for on-line analysis and decision-making support for a process plant operator during both normal and emergency plant operating conditions.

Yet another object of the present invention is to provide a diagnostic method for an operating system which combines physical principles with artificial neural networks to construct a hybrid two-level hierarchical knowledge structure for system diagnostics.

It is yet another object of the present invention to provide a method for the diagnosis of faulty components which is based on component characteristics and does not require a preconceived set of component malfunctions.

A further object of the present invention is to provide a diagnostic method for an operating thermal-hydraulic system by identifying malfunctions of generic component classes through use of generic component characteristics.

Yet another object of the present invention is to provide a method for the diagnosis of faulty components in an operating system by identifying specific component malfunctions through use of specific component characteristics.

A still further object of the present invention is to provide a method for the diagnosis of faulty components which is based on the use of neural networks to identify generic and specific component thermal hydraulic characteristics.

Still another object of the present invention is to use artificial intelligence techniques to diagnose component malfunctions in a realistic environment, which diagnosis is capable of being verified and validated, is flexible enough to diagnose an unforseen event, and is capable of handling data noise and limited instrumentation.

A further object of the present invention is to provide a diagnostic method for complementing the accident management strategy of large-scale processes by performing diagnoses at both the plant and component level and providing the process operator with the component which most likely caused the observed process disturbance.

A still further object of the present invention is to provide a method for diagnosing abnormal conditions in an operating system which may be applied to various processes in the chemical industry as well as to electrical power generating stations (both nuclear and fossil) which increases operating system safety and reduces operating costs.

The present invention contemplates a diagnostic method which employs a hierarchical structure knowledge base with two levels in which the decision making procedure is in the order of decreasing intelligence with increasing precision. The first level is function-based, where the diagnostic method is general and has knowledge of the overall process including a wide variety of plant transients and the functional behavior of the process components. At the second level, which is component characteristic-based, the diagnostic method limits its scope to component malfunctions, but with more detailed knowledge of component characteristics. Once an anomaly in the process behavior has been detected, the hierarchical hybrid structure is used to successively narrow the diagnostic focus of the inventive method until the fault can be determined. At the first level, physical principles are used in an expert system (ES) to narrow the diagnostic focus to a particular set of possible faulty components. At the second level, trained Artificial Neural Networks (ANNs) representing component characteristics are used to further narrow the diagnosis and identify the faulty component by classifying the abnormal process data as a failure of one of the hypothesized faulty components.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

The inventive diagnostic methodology described herein utilizes basic physical principles, knowledge of component characteristics and process-based knowledge. Basic physical principles are used both for analysis of macroscopic mass, energy and momentum balances in thermal-hydraulic control volumes and for the physical functional classification of the process components. Knowledge of component characteristics is used first to discriminate between generic component types and then between specific components of the same generic type. Process-based knowledge is used to represent the structural arrangement of the various components and systems of the process and corresponding connectivity relations. Described herein is the framework for the utilization of component characteristics and for the development of the balance equations, the functional classification of components and the process structural information that form a first-principles knowledge base.

DIAGNOSTIC TECHNIQUE

In contrast to the non-systematic, heuristic construction of a rigid knowledge base that uses an event-oriented approach for process diagnosis, the present invention employs a different approach that involves the systematic construction of a function- and component characteristics-oriented hierarchical structure knowledge base. A two-level hierarchical approach corresponding to function- and component characteristic-oriented diagnosis, respectively, is proposed that structures the decision-making procedure in order of decreasing intelligence with increasing precision. At the first level, the diagnostic system is general and has knowledge of the overall process including a wide variety of plant transients and the functional behavior of the process components. At the second level, the diagnostic system limits its scope to component malfunctions, but with more detailed knowledge of component characteristics.

Once an anomaly in the process behavior has been detected, the hierarchical structure is used to successively narrow the diagnostic focus of the system from a function misbehavior (i.e., a function-oriented approach) until the fault can be determined (i.e., a component characteristic-oriented approach). At the first level, a first principles-based Expert System is used to narrow the diagnostic focus to a particular set of possible faulty components that could be responsible for the detected functional misbehavior of the system. At the second level, trained Artificial Neural Networks are used to further narrow the diagnosis and to identify the faulty component by classifying the abnormal process data as a failure of one of the hypothesized components through component characteristics.

Figure 6:
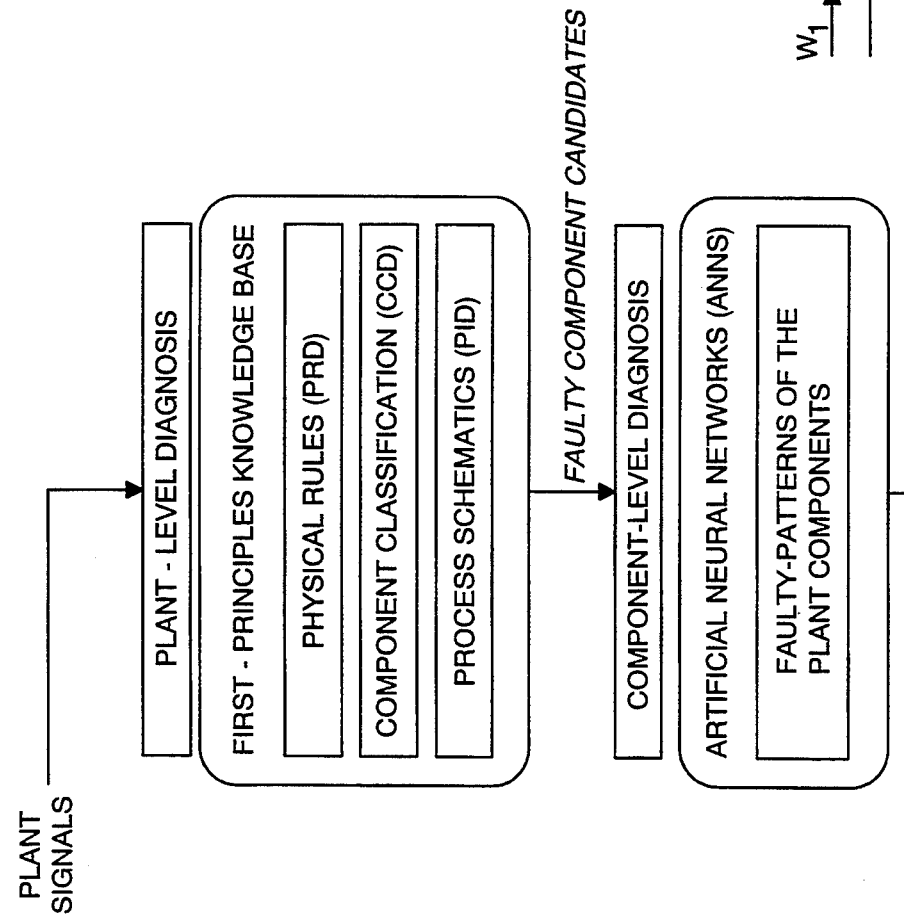
FIG. 6 is a simplified flow chart illustrating the overall hierarchical two-level structure of the present invention. The first level represented by an expert system performs plant-level diagnosis, while the second level represented by neural networks performs component-level diagnosis. The first-principles knowledge base of the expert system is comprised of three databases in accordance with the present invention, where the three-database structure includes Physical Rules (PRD), Component Classification Dictionary (CCD) and Process Schematics (PID). The neural networks at the second level of the present invention are trained to discriminate between patterns of different component types with the same function as well as to discriminate between patterns of different specific components of the same type.
Figure 7:
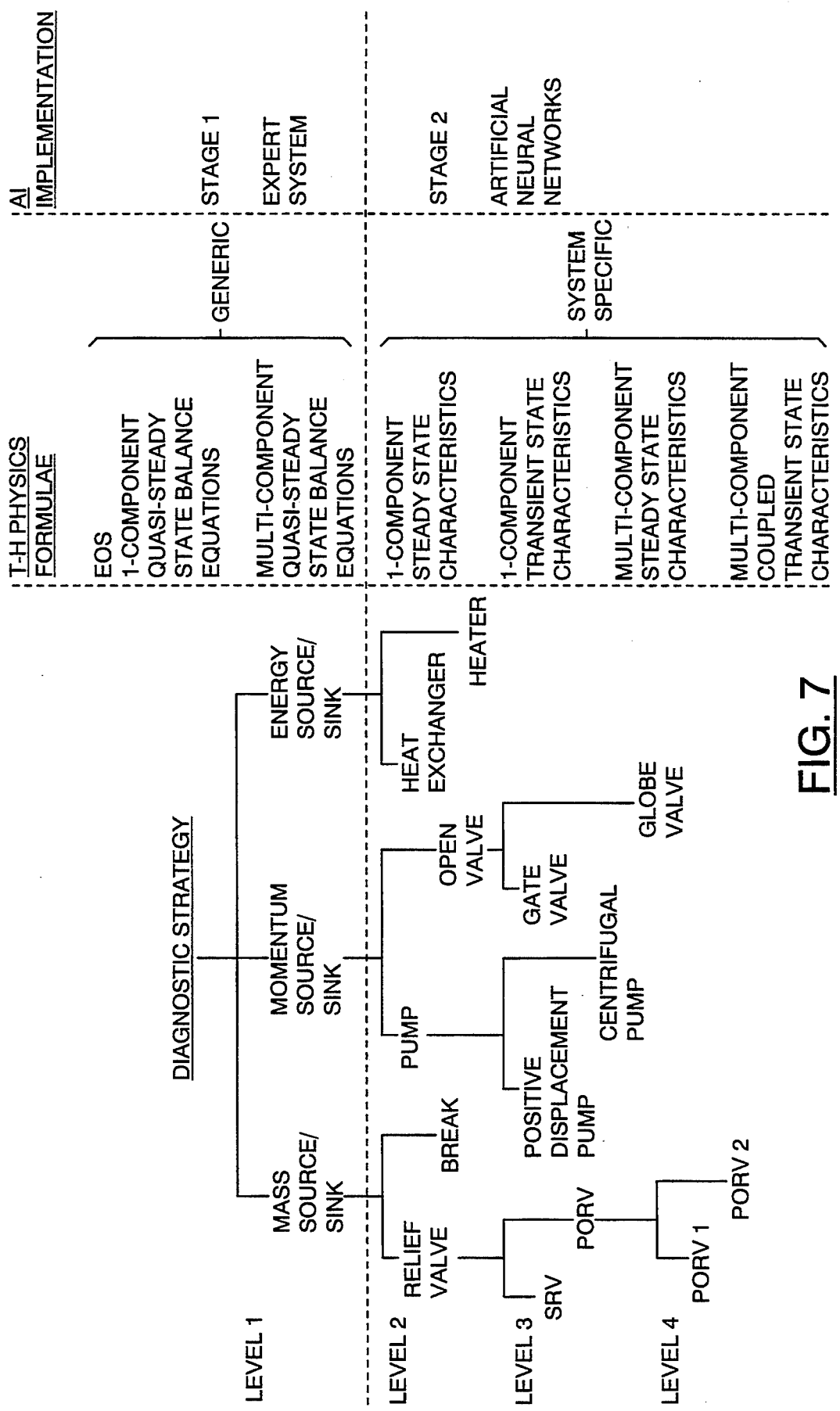
FIG. 7 is an expansion of FIG. 6 illustrating additional details of the diagnostic strategy carried out in the combined expert system/neural networks method for process fault diagnosis of the present invention.

The diagnostic technique is best summarized in FIGS. 6 and 7. The thermal-hydraulics (T-H) physics knowledge is composed of balance equations (mass, momentum, and energy) applied to specific control volumes, the equations of state (EOS), and the component characteristics. Based on a physics-grounded approach, the diagnosis is split into the two stages shown in FIGS. 6 and 7. The first stage is to use signals throughout different parts of the plant and correlate them to develop a list of potential faulty component candidates through usage of the T-H physics knowledge which couple the different components together to form a system-wide response. This T-H physics knowledge for the system-wide response is composed of the balance equations (mass, momentum, and energy) applied to specific control volumes and the equation of state (EOS). The next stage in the diagnosis hierarchy is the component-level diagnosis where the component-level characteristics are used to determine the specific faulty component from the list of the faulty component candidates selected by the plant-level diagnosis. Component characteristics used by this stage are characteristics such as valve characteristics and pump characteristics. In summary, the overall strategy is a two-stage diagnosis process with the physics of T-H (balance equations, EOS, component characteristics) being split up between the two stages. In terms of Artificial Intelligence (AI) implementation/programming, the present invention employs a hybrid approach. The first stage is implemented through an ES and the second stage is implemented through ANNs.

FIG. 6 shows that the first-principle knowledge base for the plant-level diagnosis ES (stage 1) is broken down into a three-database structure; Physical Rules (PRD), Component Classification Dictionary (CCD), and Process Schematics (PID). In this way, all the system-specific connectivity information are assigned to the PID. The PRD and the CCD are T-H system independent and thereby generic. The PRD represent the physical rules based on the T-H physics knowledge at the plant-level. The CCD classifies a generic list of components (pumps, valves , . . . ) by function as mass source/sink, momentum source/sink, and energy source/sink. The structure of the component-level diagnosis using ANNs (stage 2) is also further broken down into two parts; discriminatory knowledge regarding generic component characteristics (e.g., pumps vs. valves) and discriminatory knowledge regarding specific component characteristics (e.g., valve a vs. valve b). The connections between the different elements of these structures is explained in FIG. 7.

FIG. 7 is an expansion of FIG. 6 and clarifies the diagnostic technique. The diagnostic strategy is shown by the tree at the left-hand side of the figure. The T-H physics knowledge base formulae used at each level of the diagnostic methodology is shown next in FIG. 7. The methodology is presented as the tree in FIG. 7. The AI implementation of these formula either as If-Then rules or multi-layer ANNs with the corresponding boundaries are shown. Going through FIG. 7, it can be seen that the purpose of the Tree level 1 diagnosis is to classify the malfunction by function as a mass source/sink, or a momentum source/sink, or an energy source/sink imbalance. Basically, the quasi-steady T-H balance equations of state (EOS) are used and are cast in the form of If-Then rules in the ES. Tree level 2 diagnosis will separate out between generic function classes of components; pumps vs. valves, etc. ANNs are used at this stage. The ANNs which are used at this stage of the diagnosis will be termed generic component classifiers. The generic component classifier differentiates between generic component possibilities within the same Q (source/sink) function class viz ($Q_{mass}$, $Q_{momentum}$, $Q_{energy}$). It is evident that there are many types of valves. FIG. 7 shows that pneumatic operated relief valves (PORVs) have been classified under mass source/sink as these valves are initially closed. Distinction could also be made at the next level, Tree level 3, between globe valves and gate valves. The existence of a certain level in the diagnosis technique can only be justified if differentiation can be made between component characteristics at this diagnostic level. The Tree level 4 diagnosis is intended to decide which specific PORV has malfunctioned. However, ANNs could combine the Tree level 3 and Tree level 4 diagnoses into a single-level diagnosis. The ANNs which are used at this stage of the diagnosis are termed specific component classifiers. The specific component classifier selects the specific malfunctioning component from the generic component set.

The Macroscopic Balance Method

In this method, the analysis of macroscopic mass, energy and momentum imbalances in thermal-hydraulic control volumes is characterized by the effect of the variations of thermal-hydraulic and thermodynamic macroscopic properties in the equations of state. The equations of state, which describe the relations among macroscopic properties, can be used to relate the variations of properties such as fluid velocity v, pressure P and temperature T to the total mass M, energy U and momentum M inventories for a given control volume V $$M = \beta(P,T)V, \qquad (1)$$

$$U = M h(P,T) - P V, \qquad (2)$$

$$\underline{M} = M v, \qquad (3)$$

where $\beta(P,T)$ is the fluid density and $h(P,T)$ is the fluid specific enthalpy. Imbalances in the mass, energy and momentum inventories are characterized by analyzing the changes in fluid velocity, pressure and temperature in Eqs. (1) through (3). The process of evaluating these imbalances is divided into three categories: (A) Single-phase mass and energy balances, (B) Two-phase mass and energy balances, and (C) Momentum balance.

A. Single-Phase Treatment of Mass and Energy Balances

For control volumes containing single-phase fluid, pressure and temperature are two independent thermodynamic properties which are readily available and can be used to specify the state of a substance in both subcooled liquid and superheated steam conditions. Changes in pressure P and/or temperature T of a single-phase fluid would cause changes in the fluid density $\beta(P,T)$ and specify enthalpy $h(P,T)$, which in turn would cause variations in mass M and energy U inventories of Eqs. (1) and (2), respectively. Analysis of the variations of M and U as a function of changes in P and T can be obtained through the analysis of the differentials dM and dU of Eqs. (1) and (2), for a fixed volume V $$dM = V \left( \frac{\partial \rho}{\partial T} dT + \frac{\partial \rho}{\partial P} dP \right), \text{ and} \qquad (4)$$

$$dU = Vh\rho \left\{ \frac{1}{\rho} \left[ \frac{\partial \rho}{\partial T} dT + \frac{\partial \rho}{\partial P} dP \right] + \frac{1}{h} \left[ \frac{\partial h}{\partial T} dT + \frac{\partial h}{\partial P} dP \right] \right\}, \qquad (5)$$

where the term P V in Eq. (2) has been neglected.

With the use of tables that represent the equations of state, e.g., steam tables for water, the variations of $\beta$ and h as a function of P and T can be directly obtained and used to analyze dM and dU. The analysis can be quantitative or qualitative. Quantitative analysis consists of a table lookup, where values for $\beta$ and h are obtained from measurements of P and T and are then compared with the expected values of $\beta_0$ and $h_0$ to determine dM and dU as $$dM = M(\beta) - M(\beta_0), \qquad \text{and}$$

$$dU = U(\beta, h) - U(\beta_0, h_0).$$

Quantitative analysis requires the storage of the equation-of-state tables in a program routine and is performed on-line for each diagnosis operation. On the other hand, qualitative analysis requires no storage of tables, needs to be performed only once and can be incorporated in the knowledge base of a diagnosis system as a set of precompiled first-principles rules. These rules are physically correct and are completely general in that the rules are independent of the process under consideration. However, qualitative analysis may generate ambiguous results due to some loss of information. For instance, the addition of quantities of opposite sign results in ambiguity, since relative magnitudes are not known. Hence, a hybrid utilization of qualitative and quantitative analysis of the balance equations is a feasible alternative. Quantitative analysis can be used when qualitative reasoning results in ambiguity.

Qualitative analysis of Eqs. (4) and (5) is performed in the equivalent equations $$[dM] = \left[ \frac{\partial \rho}{\partial T} \right][dT] + \left[ \frac{\partial \rho}{\partial P} \right][dP], \qquad (6)$$

$$[dU] = \left[ \frac{1}{\rho} \right] \left( \left[ \frac{\partial \rho}{\partial T} \right][dT] + \left[ \frac{\partial \rho}{\partial P} \right][dP] \right) + \left[ \frac{1}{h} \right] \left( \left[ \frac{\partial h}{\partial T} \right][dT] + \left[ \frac{\partial h}{\partial P} \right][dP] \right), \qquad (7)$$

through qualitative algebraic operations with the trends of the quantities inside the bracket [.]. Given the signs or trends (increasing, decreasing, constant) in the partial derivatives and differentials of the right-hand-side of the equations, analysis is performed by applying the operations of qualitative algebra of product (.) and addition (+) among the brackets. The trends in the differentials dT and dP are readily available from the variations in T and P, respectively. The trends in the partial derivatives, $\delta\rho/\delta T$, $\delta\rho\delta P$, $\delta h/\delta T$, $\delta h/\delta P$, are directly obtained from the equation-of-state tables and are illustrated in Table I for the steam tables. From this point on, the steam tables are used as an example of the equation-of-state, but the presented methodology is general and is not limited to water properties. All eight partial derivatives in Table I present a monotonic behavior with the exception of $\delta h/\delta P$ for subcooled liquid after about 523 K. After 523 K $\delta h/\delta P$ becomes slightly negative. The monotonic behavior of the partial derivatives is fundamental in the qualitative analysis of the balance equations.

TABLE I

| | Trends in the Partial Derivatives. | | | |
| --- | --- | --- | --- | --- |
| | $\partial p/\partial T$ | $\partial p/\partial P$ | $\partial h/\partial T$ | $\partial h/\partial P$ |
| Subcooled Liquid | ↓ | ↑[a] | ↑ | ↑[b] |
| Superheated Steam | ↓ | ↑ | ↑ | ↓ |

[a]negligible changes due to water incompressibility
[b]until 523K

The operations of qualitative algebra of product and addition of a change $\Delta X$ in variable X and a change $\Delta Y$ in variable Y are represented in Tables II and III, respectively. The trends in $\Delta X$ and $\Delta Y$ can yield either increasing (↑), decreasing (↓), constant (~) or indeterminate (?) qualitative inferences. For instance, Table II shows that the product of an increasing trend in $\Delta X$ ($\uparrow$) and a decreasing trend in $\Delta Y$ ($\downarrow$) yields a decreasing ($\downarrow$) trend. The addition of similar trends in $\Delta X$ and $\Delta Y$, illustrated in Table III, results in an indeterminate (?) or ambiguous inference.

TABLE II

Qualitative Product [$\Delta X$] · [$\Delta Y$].

| $\Delta X$ | $\Delta Y$ | | |
|---|---|---|---|
| | $\sim$ | $\uparrow$ | $\downarrow$ |
| $\sim$ | $\sim$ | $\sim$ | $\sim$ |
| $\uparrow$ | $\sim$ | $\uparrow$ | $\downarrow$ |
| $\downarrow$ | $\sim$ | $\downarrow$ | $\uparrow$ |

TABLE III

Qualitative Addition [$\Delta X$] + [$\Delta Y$].

| $\Delta X$ | $\Delta Y$ | | |
|---|---|---|---|
| | $\sim$ | $\uparrow$ | $\downarrow$ |
| $\sim$ | $\sim$ | $\uparrow$ | $\downarrow$ |
| $\uparrow$ | $\uparrow$ | $\uparrow$ | ? |
| $\downarrow$ | $\downarrow$ | ? | $\downarrow$ |

The qualitative analysis of the mass inventory of Eq. (6), for single-phase fluid, is illustrated in Table IV. The rows of Table IV correspond to the nine possible combinations in the trends of T and P, which are represented in the first and second columns of the table. The third and fourth columns correspond to the qualitative behavior of the mass inventory for subcooled liquid and superheated steam, respectively, as a function of the trends in T and P of the associated row. The qualitative behavior of the mass inventory for the first seven rows of the table are uniquely obtained by applying the information of Tables I, II and III into Eq. (6). For example, in the case of $\Delta T \uparrow$ and $\Delta P \downarrow$, represented by the sixth row of Table IV, the decreasing ($\downarrow$) behavior of the mass inventory in both subcooled liquid and superheated steam conditions is obtained by substituting the trends of Table I into Eq. (6) and applying the qualitative operations of Tables II and III $$[dM] = \left[\frac{\partial \rho}{\partial T}\right][dT] + \left[\frac{\partial \rho}{\partial P}\right][dP].$$

$$= [\downarrow] \cdot [\uparrow] + [\uparrow] \cdot [\downarrow]$$

$$[\downarrow] + [\uparrow]$$

$$[\downarrow]$$

TABLE IV

Qualitative Analysis of Single-Phase Mass Inventory.

| | Variations | | Mass Inventory ($\Delta M$) | |
|---|---|---|---|---|
| | Temperature ($\Delta T$) | Pressure ($\Delta P$) | Subcooled Liquid | Superheated Steam |
| 1 | $\sim$ | $\sim$ | $\sim$ | $\sim$ |
| 2 | $\uparrow$ | $\sim$ | $\downarrow$ | $\downarrow$ |
| 3 | $\downarrow$ | $\sim$ | $\uparrow$ | $\uparrow$ |
| 4 | $\sim$ | $\uparrow$ | $\sim^a$ | $\uparrow$ |
| 5 | $\sim$ | $\downarrow$ | $\sim^a$ | $\uparrow$ |
| 6 | $\uparrow$ | $\downarrow$ | $\downarrow$ | $\downarrow$ |
| 7 | $\downarrow$ | $\uparrow$ | $\uparrow$ | $\uparrow$ |
| 8 | $\uparrow$ | $\uparrow$ | $\downarrow^b$ | ? |
| 9 | $\downarrow$ | $\downarrow$ | $\uparrow^b$ | ? |

[a]Negligible changes due to water incompressibility
[b]For $\frac{|\Delta P|}{P} \leq 100 \frac{|\Delta T|}{T}$ For the last two rows of Table IV, ambiguities in qualitative operations prevent a unique characterization of the behavior in the mass inventory for both subcooled liquid and superheated steam conditions. For instance, for the eighth row where $\Delta T \uparrow$ and $\Delta P \uparrow$ we obtain:

$$[dM] = \left[\frac{\partial \rho}{\partial T}\right][dT] + \left[\frac{\partial \rho}{\partial P}\right][dP].$$

$$= [\downarrow] \cdot [\uparrow] + [\uparrow] \cdot [\uparrow]$$

$$[\downarrow] + [\uparrow]$$

$$[\uparrow]$$

The quantitative addition of a decreasing first term with an increasing second term results in the indeterminate (?) behavior of dM. Hence, the net result depends on the relative magnitude of the two terms. For subcooled liquid, parametric studies show that for reasonable changes in T and P the first term of Eq. (6) is the dominant one, due to the negligible compressibility of water, causing dM to decrease. An exception to this tendency would occur only when the relative change in P is about two orders of magnitude larger than the relative change in T. For superheated steam, a general trend cannot be obtained for the last two rows of Table IV. The net result of Eq. (6) oscillates between the two terms depending on the relative variations of T and P. In this case, quantitative analysis needs to be used to unambiguously determine the trend in dM.

A similar approach could be used to obtain the qualitative behavior of the energy inventory dU of Eq. (7). The problem with this approach is that the large number of qualitative addition operations generally results in an ambiguous inference. Instead, the analysis of the qualitative behavior of the energy inventory is obtained directly through parametric studies of T and P with the steam tables. The results of the analysis are presented in Table V, which has the same layout as that of Table IV. The table shows that a general qualitative behavior of the energy inventory can be obtained for almost all possible combinations of the variations of T and P. However, as in the analysis of the mass inventory, the last two rows of Table V for superheated steam are also indeterminate. In this case, as in Table IV, the ambiguity can be resolved only for specific changes of T and P, and quantitative analysis must be employed.

TABLE V

Qualitative Analysis of Single-Phase Energy Inventory.

| | Variations | | Energy Inventory ($\Delta U$) | |
|---|---|---|---|---|
| | Temperature ($\Delta T$) | Pressure ($\Delta P$) | Subcooled Liquid | Superheated Steam |
| 1 | $\sim$ | $\sim$ | $\sim$ | $\sim$ |
| 2 | $\uparrow$ | $\sim$ | $\uparrow$ | $\downarrow$ |
| 3 | $\downarrow$ | $\sim$ | $\downarrow$ | $\uparrow$ |
| 4 | $\sim$ | $\uparrow$ | $\sim^a$ | $\uparrow$ |
| 5 | $\sim$ | $\downarrow$ | $\sim^a$ | $\downarrow$ |
| 6 | $\uparrow$ | $\downarrow$ | $\uparrow^b$ | $\downarrow$ |
| 7 | $\downarrow$ | $\uparrow$ | $\downarrow^b$ | $\uparrow$ |
| 8 | $\uparrow$ | $\uparrow$ | $\uparrow$ | ? |
| 9 | $\downarrow$ | $\downarrow$ | $\downarrow$ | ? |

[a]Negligible changes due to water incompressibility
[b]For $\frac{|\Delta P|}{P} \leq 100 \frac{|\Delta T|}{T}$ B. Two-Phase Treatment of Mass and Energy Balances The analysis of mass and energy balances for a control volume containing two-phase fluid is restricted to components in which the liquid f and the vapor g phases are separable and assumed to be at their corresponding saturation conditions. Since under saturation conditions pressure and temperature are not independent thermodynamic properties, the trend in the measurable liquid level L is used in addition to the saturation pressure P, to determine the behavior of the total mass M and energy U inventories. As an extension for Eqs. (1) and (2), P and L can be related to the total M and U inventories of a given control volume V through the equations of state $$M = M_f + M_g, \quad (8)$$
$$= \rho_f(P)V_f(L) + \rho_g(P)V_g(L),$$
$$= A\{\rho_f(P)L + \rho_g(P)(H - L)\},$$

$$U = U_f + U_g, \quad (9)$$
$$= \rho_f(P)h_f(P)V_f(L) + \rho_g(P)h_g(P)V_g(L),$$
$$= A\{\rho_f(P)h_f(P)L + \rho_g(P)h_g(P)(H - L)\},$$

where the P V term in Eq. (2) has been neglected, A is the cross-sectional area and H is the total height of the control volume V, $\beta f$ is the saturated-liquid density, $\beta g$ is the saturated-vapor density, $h_f$ is the saturated-liquid enthalpy and $h_g$ is the saturated-vapor enthalpy.

The qualitative analysis of M and U in Eqs. (8) and (9), or the differential counterparts dM and dU, requires the utilization of the steam tables for extraction of the values of $\beta f$, $\beta g$, hf and hg as functions of the variations in P and L, plus the knowledge of the component total height H. The latter requirement stipulates a geometric dependency in the analysis of both equations and prevents the precompiled construction of the physical first-principles rules. Since our approach is intended to be generic and independent of the process being diagnosed, the physical rules describing mass and energy imbalances for two-phase fluid are generated on-line, through table lookup, as the process experiences a malfunction.

C. The Momentum Balance

The analysis of momentum balance in a control volume requires more information than does that of mass and energy. In addition to the knowledge of temperature and pressure for the control volume under consideration, momentum balance also requires information about the fluid velocity. The product of the fluid velocity v and the total mass M defines momentum $\underline{M}$, as described in Eq. (3). Since the fluid velocity v is generally obtained through measurements of the mass flow rate W, where W=v A, with A being the cross-sectional area of the where W=v $\beta$A, with A being the cross-sectional area of the control volume, Eq. (3) can be rewritten in terms of W, with the use of Eq. (1).

$$\underline{M} = L\ W, \quad (10)$$

where L is the length of the control volume. Since L is fixed for a given volume, the analysis of momentum balance is directly obtained through the differential $$d\underline{M} = L\ dW. \quad (11)$$

Hence, momentum is added to a control volume if the associated measured flow rate W is increasing and it is subtracted from a control volume if the associated measured flow rate is decreasing.

Conservation Diagnostic Rules

For the diagnosis to proceed, the macroscopic imbalances in mass, momentum and energy inventories in thermal-hydraulic control volumes given by the macroscopic balance method have to be related to imbalances in sources or sinks of mass, momentum or energy, respectively. This is carried out through usage of mass, momentum and energy conservation equations as expressed in terms of symbolic rules. These symbolic rules are the conservation diagnostic rules of the PRD. The procedure is illustrated here with simplified forms of the three conservation equations. These are:

$$\frac{dM}{dt} = \sum_i w_i - \sum_o w_o + Q_{mass} \quad (12)$$

$$\frac{d}{dt}(\underline{M}/A) = P_i - P_o + Q_{mom}\{\delta P_{pump}\} + \sum_j \frac{Q_{mom}}{\rho}\{k_j\}(w_j/A_j)^2 \quad (13)$$

$$\frac{d(U + P/\rho)M}{dt} = \sum_i w_i(U + P/\rho) = \sum_o w_o(U + P/\rho) + Q_{eng} \quad (14)$$

where
A = control volume flow area
i = control volume inlet
o = control volume outlet
w = mass flow rate
$\delta P_{pump}$ = pump head
$k_j$ = flow loss coefficient
$Q_{mass}$ = mass source/sink
$Q_{mom}$ = momentum source/sink
$Q_{eng}$ = energy source/sink
{ } = function of Eqs. 12–14 are, respectively, the conservation equations of mass, momentum and energy. For incompressible fluids and quasistatic conditions, the three conservations equations can be further simplified. The mass equation, Eq. (12), is used as an example. It becomes for single inlet and outlet ports in a control volume, $$w_o = w_i + Q_{mass} \quad (15)$$

Differentiation of Eq. (15) gives $$dW_o = dw_i + dQ_{mass} \quad (16)$$

Qualitative analysis of Eq. (16) is performed in the equivalent equation $$[dQ_{mass}] = [dw_o] - [dw_i] \quad (17)$$

through qualitative algebraic operations with the trends of the quantities inside the bracket [.]. Given the signs or trends (increasing, decreasing, constant) in the differentials of the right-hand-side of the equation, analysis is performed by applying the operations of qualitative algebra of product (.) and addition (+) among the brackets. The trends in the differentials $w_i$ and $w_o$ are readily available from the variations in $w_i$ and $w_o$, respectively. The qualitative analysis of the mass conservation equation, Eq. (15), is illustrated in Table VI. The notation for the trends is increasing ( ↑ ), decreasing ( ↓ ), constant (∼) or indeterminate (?) qualitative inferences. The use of the incompressibility assumption implies that the imbalance in the mass inventory given by the macroscopic balance method is zero so one of the symbolic conservation diagnostic rules for the mass conservation equation derived from Table VI is, If mass inventory in a control volume is constant while inlet flow is increasing and outlet flow is decreasing, then the mass source is decreasing in the control volume.

This is an example of how diagnosis technique relates the mass inventory imbalances to mass source or sink imbalances through the usage of the mass conservation equations. Other such mass conservation diagnostic rules can be derived from Table VI. Momentum and energy conservation diagnostic rules relating momentum or energy imbalances to changes in momentum or energy sources or sinks can be similarly derived from Eqs. (13) and (14), respectively, using the qualitative analysis procedure

TABLE VI

Qualitative Analysis of Mass Conservation Equation

| Variations | | Mass Conservation |
|---|---|---|
| Inlet Flow ($\Delta w_i$) | Outlet Flow ($\Delta W_o$) | Mass Source/Sink ($\Delta Q_{mass}$) |
| ~ | ~ | ~ |
| ↑ | ~ | ↓ |
| ↓ | ~ | ↑ |
| ~ | ↑ | ↑ |
| ~ | ↓ | ↓ |
| ↑ | ↓ | ↓ |
| ↓ | ↑ | ↑ |
| ↑ | ↑ | ? |
| ↓ | ↓ | ? |

Functional Classification of Components

The methodology for process diagnosis provided in this invention relies on the characterization of imbalances in the process components, as described in the foregoing paragraphs, along with the functional classification of the components. Each component type, e.g., pipe, pump and electric heater, is functionally classified according to the component influence in causing an imbalance in the conservation equations if and when the component fails. For example, a pump should be functionally classified as a source or sink of momentum because a pump failure causes an imbalance in the momentum conservation equation. This method differs from other approaches to functional characterization of components in that each component type is classified permanently and that the classification is based on physical laws, as opposed to multiple and judgmental classification based on the importance of the component in a given context.

Table VII illustrates the functional classification of some of the most common components present in industrial processes. For instance, the last component in the table, a valve, functions both as a sink or source of momentum. Unexpected closure of a valve would cause a negative balance in the momentum conservation equation, yielding a functional classification for the valve as a momentum sink. On the other hand, an unexpected valve opening would cause a positive imbalance in the momentum equation, yielding classification as a momentum source. The classification presented in Table VII represents the major influence of a component in one of the three (mass, energy and momentum) balance equations. Each component type can, however, be hierarchically classified according to the component capability in disturbing each one of the three balances. A hierarchical component classification would increase the comprehensiveness of the diagnosis but it would, most likely, depend on the phase of the substance, e.g., liquid or vapor, being transported through the component.

TABLE VII

Functional Classification of Components.

| COMPONENT | FUNCTIONAL CLASSIFICATION |
|---|---|
| Pump | Momentum Source or Sink |
| Pipe | Momentum Source and Sink |
| Electric Heater | Energy Source or Sink |
| Valve | Momentum Source or Sink |

Process Structural Representation

In addition to the functional behavior of the various systems and components of a process plant, plant operators also use their understanding of the structural arrangement of these components when faced with unexpected scenarios and being forced to diagnose the unfolding event and make corrective control actions. The operator's structural understanding of the process relates to graphical or schematic representations of the plant in the form of piping and instrumentation diagrams (P&IDs). Since the information content of a P&ID is essential for diagnosing process malfunctions and it is readily available, for a given process, it has been constantly used as part of the knowledge base of a process diagnosis expert system. In the first generation of expert systems, the information content of the P&IDs was embedded in the production rules. More recently, the P&IDs have been represented in a separate knowledge base which allows for complete independence between the diagnosis methodology and the plant process. The following paragraphs describe the representation of schematic diagrams within the context of the proposed diagnosis methodology.

In this work, the structural domain knowledge of schematic diagrams of a process is represented through directed graph structures and is compiled in a separate knowledge base. The description of a schematic diagram by a graph structure is achieved through a straightforward nodalization process. Each component or component part in a schematic diagram is a node of the graph, while each connection between two components corresponds to an edge. When the edges are directed, i.e., represented by ordered pairs, the graph is a directed graph. Furthermore, a graph structure can be decomposed into loops, i.e., sub-graphs, just as one defines loops or circuits in a schematic diagram.

Figure 1:
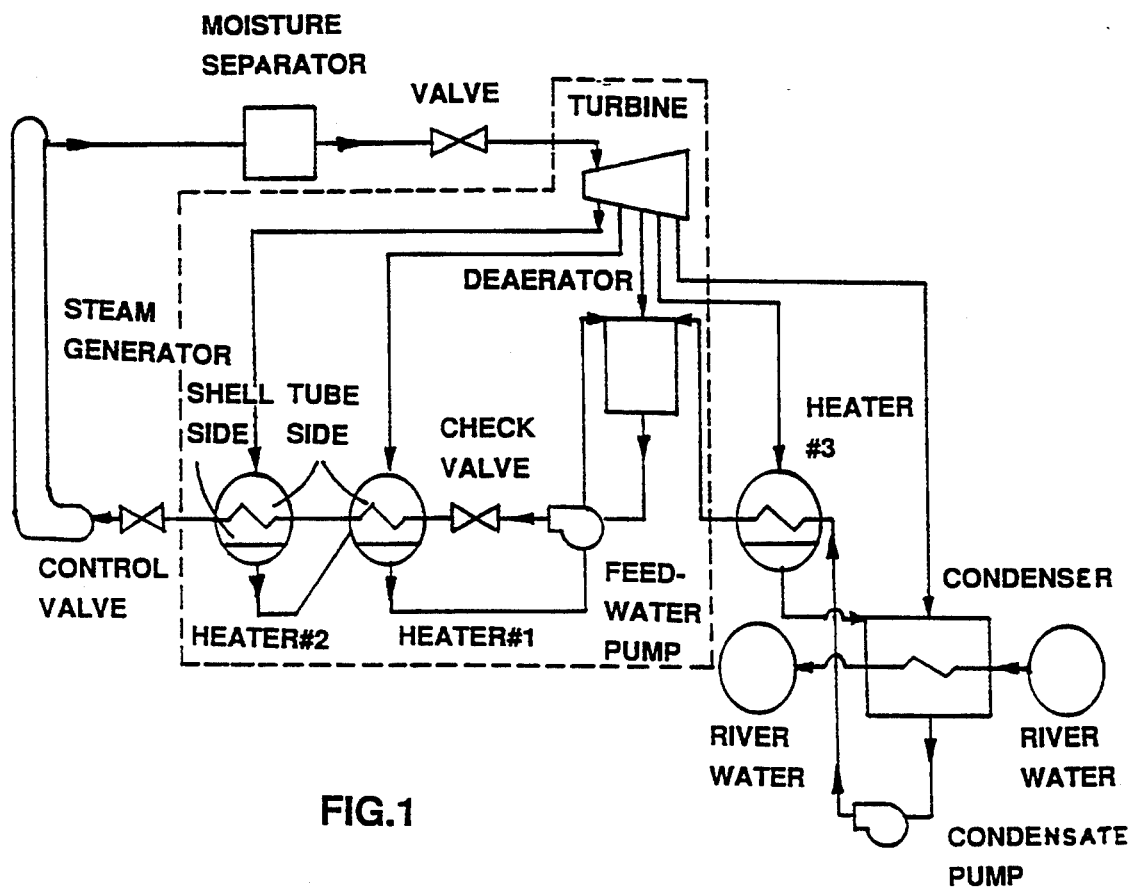
FIG. 1 is a simplified schematic diagram of a balance of plant (BOP) for a liquid metal nuclear reactor (LMR) plant which is typical of an operating system with which the diagnostics method of the present invention is intended for use.
Figure 2:
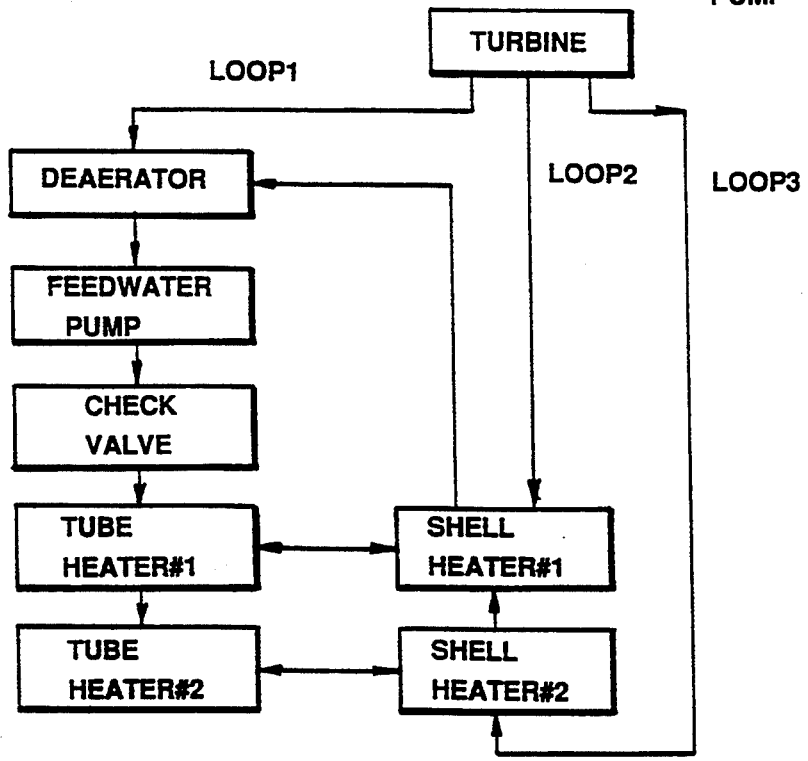
FIG. 2 is a simplified graph structure illustrating a plurality of interconnected nodes, where each node corresponds to a respective component or component part surrounded by the dashed lines in FIG. 1, while the physical connections between components, i.e., the pipings, are represented by the directed edges or arcs of the graph structure in the figure.

FIG. 1 illustrates the schematic diagram of a balance of plant (BOP) for a liquid metal nuclear reactor (LMR) plant. The nodalization of the components in FIG. 1 that fall inside the dashed lines is represented in FIG. 2. Each component or component part surrounded by the dashed lines in FIG. 1 corresponds to a node in FIG. 2, while the physical connections between components, i.e., the pipings, are represented by the directed edges or arcs of the graph structure in FIG. 2. The possible paths between two components and the distinction between heater tube and shell sides in the schematic diagram are characterized in the graph structure as distinct loops.

The knowledge base corresponding to the directed graph structure representation of a schematic diagram describes three kinds of information: component specific, intra-loop and inter-loop.

(i) Component specific information—describes the characteristics of each component including: component name, type, fluid phase, value and trend of four plant parameters (temperature, pressure, liquid level and flows), and behavior (source or sink of mass, momentum and energy).

(ii) Intra-loop information—describes all possible paths between any two components in a given loop.

(iii) Inter-loop—describes which components of a loop are adjacent to components of another loop and all possible paths between any two components of distinct loops.

This knowledge base is the only process-dependent data of the proposed diagnosis methodology, and it can be easily improved or modified to accommodate any changes in the process.

DIAGNOSIS PROCEDURE

After the methods for estimating macroscopic imbalances, classifying components and describing the process schematics have been developed, diagnostic rules and procedures can be applied to identify the possible faulty components. In essence, the diagnostic procedure first identifies a component malfunction with respect to violations in the conservation equations and then relates unusual changes in these factors with appropriate component functionality and location. The diagnostic procedure assumes the occurrence of single faults and availability of validated sensor measurements in the process components. In addition, knowledge of the correct state of the process at the onset of the malfunction is also assumed to be known.

Figure 3:
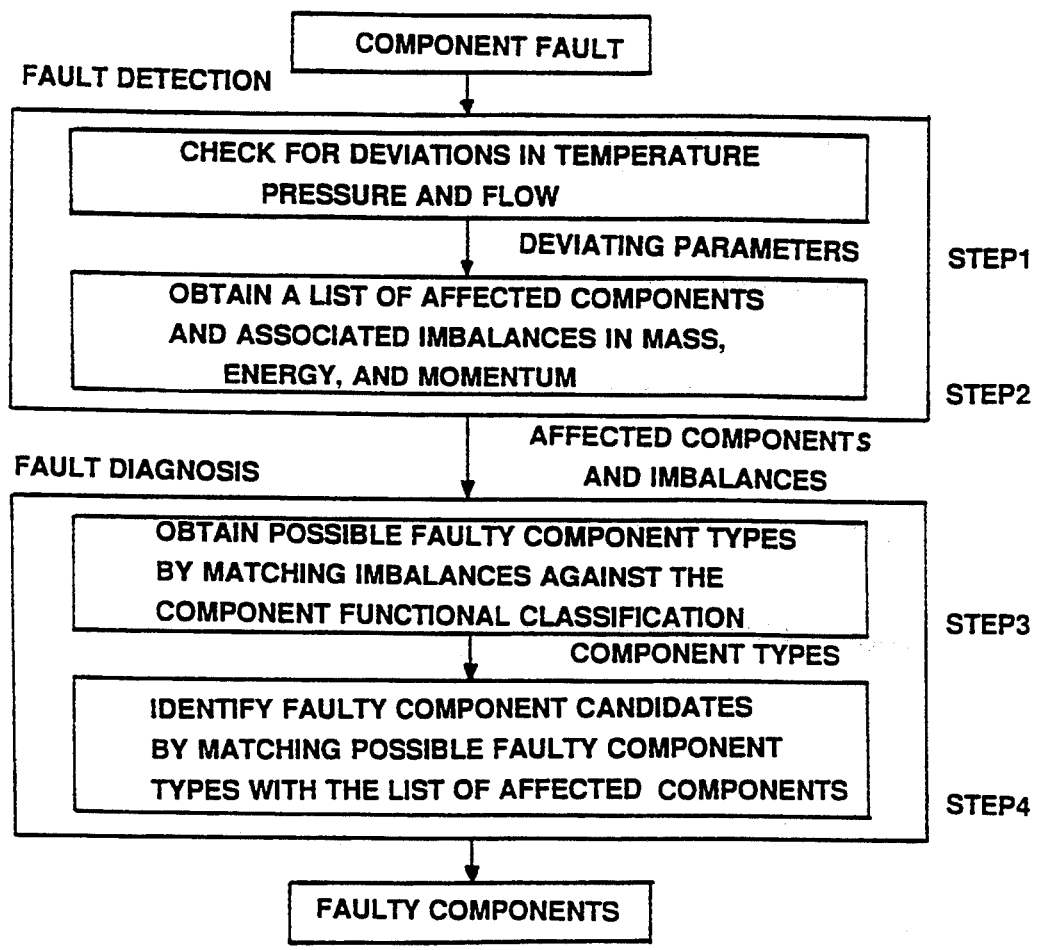
FIG. 3 is a simplified flowchart of a fault detection and diagnosis method illustrating the first level of the two-level hierarchical structure of the present invention.

FIG. 3 is a simplified flowchart of a fault detection and diagnosis method illustrating the first level of the two-level hierarchical structure of the present invention. The initiating process fault will cause one or more of the four monitored sensor measurements (temperature, pressure, liquid level and flow) to deviate from the expected state in one or more components. The diagnosis procedure for these misbehaving components involves the following four steps:

1. State deviations and corresponding increasing or decreasing trends are defined by establishing threshold values for each one of the four sensor measurements and comparing the expected component state with associated measurements.

2. Based on the trends of the varying measurements and the condition of the components (subcooled liquid, saturated, superheated steam), the precompiled physical rules of Tables IV and V and/or table lookup through the steam tables are used to characterize mass and energy imbalances in the components. Momentum imbalances are characterized through direct measurements of mass flow rates. The increasing or decreasing imbalance directions characterize the behavior of each component as a source or sink, respectively, of mass, energy or momentum through usage of the diagnostic rules which are based on the mass, momentum and energy conservation equations. Rules such as these are described in the section on conservation diagnostic rules.

3. A set of possible faulty component types, e.g., pump, pipe and electric heater, is generated by matching the type (mass, momentum or energy) and direction (source or sink) of estimated imbalances against a component functional database such as the one described in Table VII.

4. Faulty component candidates are hypothesized if the type of the misbehaving components matches one of the component types generated by step 3. The matching process is implemented through the knowledge base that describes the schematic diagrams of the process.

The diagnosis procedure can be better understood through an example. An unexpected reduction of the pump motor torque of the feedwater pump in FIG. 1 would cause a slight pressure increase upstream of the pump, a pressure decrease downstream and a decrease of the mass flow rate both up and downstream of the malfunctioning pump. These deviations cause the components up and downstream of the pump, which are transporting subcooled liquid, to behave as momentum sinks. The functional classification of pumps and valves as sources or sinks of momentum and the existence of these two component types in the group of misbehaving components flag the feedwater pump, check valve and the control valve as possible faulty components. Detailed diagnosis, to distinguish between a pump and a valve failure, can now be applied by the trained neural networks at the second-level of the diagnostic structure.

The following description illustrates the diagnostic procedure for the two levels of the combined expert system/neural networks method of the present invention with specific examples of various component malfunctions. At the first hierarchical level of the two-level diagnostic procedure, the overall process is visualized as a network of flow paths representing the various components of the process described by the PID. Each plant component is associated with a control volume characterized by lumped thermal-hydraulic and thermodynamic properties such as temperature and pressure, and obeys the macroscopic conservation equations of mass, momentum, and energy. A component fault will cause the properties of the associated and surrounding control volumes to vary which, in turn, will cause imbalances in the conservation equations. Through the characterization of the imbalances in the plant components, faulty components can be hypothesized by relating the detected imbalances with the function of the components. The 'malfunctioning' function is then translated into a list of 'malfunctioning' generic component candidates. At this level, effort is focused on the characterization of macroscopic mass, momentum, and energy imbalances and on the functional classification of components. The equations of state enter the diagnostics in the following manner. The total mass M and energy U inventories in a control volume V can be related to the macroscopic properties of pressure P and temperature T, through the equations of state set forth above in equations 1, 2, and 3. With the use of tables that represent the equations of state, e.g., steam tables for water, the variations of $\beta$ and h as a function of P and T can be directly obtained and used to characterize changes in M and U. Hence, by measuring pressures and temperatures in the process components we could characterize imbalances in the mass and energy inventories.

The essence of the approach is to correlate the trends of certain thermodynamic variables from different parts of the plant in a qualitative physics manner to diagnose the cause of the imbalances in the conservation equations. Once the imbalances have been characterized by mapping trends in pressure and temperature into trends in the imbalances of the conservation equations, component faults can be hypothesized by relating the detected imbalances, through the use of the physical rules in the PRD, to the function of the components. In this process, the 'malfunctioning' function is translated into a list of 'malfunctioning' generic component candidates. This can be obtained through the CCD which is a library of component types (e.g., pump, valve, electric heater) functionally classified based on the primary function of each component type. For instance, if we primarily classify pumps as a source or sink of momentum, because a failure of an initially operating pump primarily causes an imbalance in the momentum conservation equation, we could then relate a detected imbalance in the momentum conservation equation to the failure of a pump. Since the failure of other component types could also have caused an imbalance in the conservation of momentum, at this first hierarchical level we can only generate hypotheses about the possible failures. The list of possible failure candidates, consistent with the PID data, is then passed on to the second stage of the diagnostic hierarchy. This is the component-level diagnostics using ANNs.

According to the overall diagnostic technique summarized in FIG. 7, the role of stage 2 in the diagnosis process is to first differentiate between potential malfunctions of generic components with the same imbalance (Q) function and then to identify the specific malfunctioning component within the same class of generic components. The approach for this stage is to perform component-level analysis using ANNs. Generic and specific component characteristics are to be identified by the ANNs in order to achieve the differentiation. The advantage of this approach is that unlike other component-level pattern recognition strategies, we do not have to formulate a matrix of event cases every time there is a system change. However, it can be seen that our strategy does require a component-by-component approach and will, therefore, be component specific. Unlike the ES which involved the generic laws of T-H physics, not all differentiation "formulas" can be identified and implemented in advance of the specific T-H system application. This, therefore, calls for a modular approach with interfacing in place for additional generic and specific components introduced by different T-H system applications. We detail here the diagnosis for the specific malfunctioning valve or pump in terms of differentiation "formulas" for the ANN representations. The ES should have differentiated between potential malfunction candidates by Q function class ($Q_{mass}$, $Q_{mom}$, $Q_{eng}$). The generic components listed in the CCD which should then enable the identification of potential candidates (pump, open valve). If an operating pump has malfunctioned, we have from the ES stage that a $Q_{mom}$ malfunction is involved. The generic component classifier differentiates between generic component possibilities within the $Q_{mom}$ function class. The first differentiator that we have is active component (pumps) vs. passive component (open valves). The momentum equation is $$\frac{L}{A} \frac{dw}{dt} = P_1 - P_2 + \delta P_{pump} + \rho g \delta h + \Sigma k_i \frac{\rho v_i^2}{2} \quad (18)$$

where
  $k_i$ = valve/pipe characteristics,
  $v_i$ = fluid velocity through ith component,
  L = inertia length,
  A = flow area,
  $\delta P_{pump}$ = pump head,
  g = gravitational constant,
  $\delta h$ = elevation difference.

For most transients of interest, the inertia term can be neglected and the quasi-static equation used. Furthermore, in most cases which start at normal operating conditions, the elevation head can also be neglected. This means Eq. 18 can be reduced to $$(P_2 - P_1) = \Delta P = \delta P_{pump} + \Sigma k_i \frac{\rho v_i^2}{2}. \quad (19)$$

Figure 8:
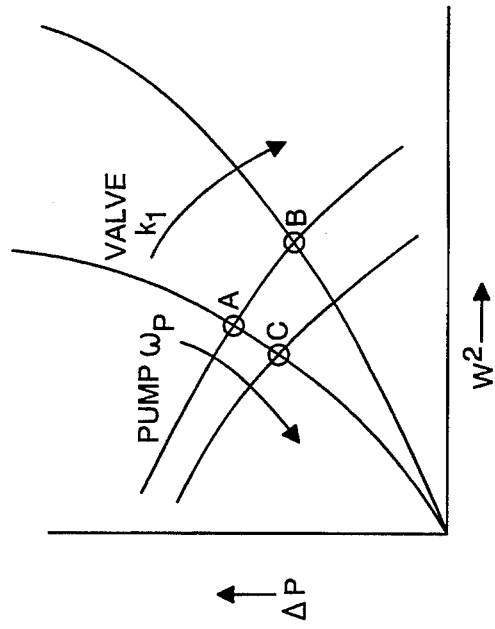
FIG. 8 is a graphical representation of the variation of change in pressure with speed for generic pump and valve components in a thermal-hydraulics system.

The form of this equation suggests that $\Delta P$ vs. $w^2$ be plotted since the fluid mass flow rate w is proportional to the fluid velocity v. FIG. 8 shows the results for generic pump and valve components. It can be seen that valve coefficient $k_i$ changes lead to a plot during a transient which is very different from the $\Delta P$ vs. $w^2$ plot which occurs when pump speed $\omega_p$ changes occur. If the normal valve and pump operation is characterized by point A in FIG. 8, a valve failure would cause the valve curve to trace the pump curve to point B, i.e., the new operating point. Similarly, a pump failure would cause the pump curve to trace the valve curve to point C, i.e., the new operating point, characterizing the faulty pump. In the case of the $k_i$ coefficient changes, the operating point traces out the pump characteristic curve in combination with some losses (friction + valve form). In the case of the $\omega_p$ speed changes, the operating point traces out the loss curve (friction + valve form) only. It can be seen from FIG. 8 that the two resulting $\Delta P$ vs. $w^2$ plots have very different shapes. They are concave in opposite directions and the derivative d $\Delta P/dw^w$ are opposite in sign. ANNs are then trained to characterize the shapes or patterns associated with the $\Delta P$ vs. $w^2$ plots which are used to differentiate between a pump and a valve failure.

Figure 9:
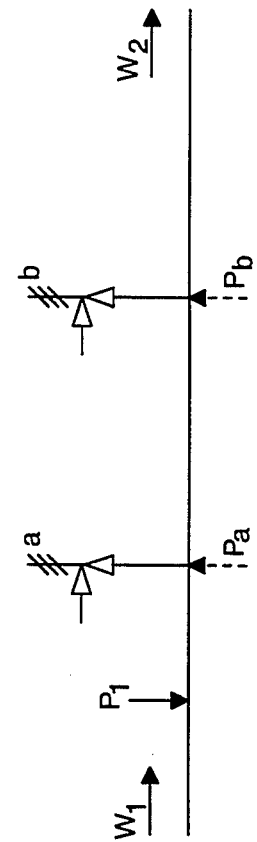
FIG. 9 is a simplified schematic diagram showing two pressure operated relief valves (PORVs) connected to a main flow pipe through surge lines used for explaining the implementation of the inventive method in a thermal-hydraulics system.

Once the generic component classifier selects a generic component, e.g., valve, it is then the function of the specific component classifier to select the specific malfunctioning component, e.g., valve 2, from the generic component set, e.g., valve 1, valve 2, valve 3. Formulas/techniques are detailed here to identify the specific malfunctioning pressure-operated relief valve (PORV) from a set of possible PORVs. As depicted in FIG. 9, two PORVs, a and b, are connected to the main flow pipe through surge lines. The function of the set of PORVs is to open at a certain system pressure to provide the main pipe with fluid relieving capability.

This invention presents a technique for selecting a malfunctioning PORV from a set of candidate PORVs based solely on the PORV characteristics. Once the generic component classifier has decided that the malfunction of an initially closed valve has occurred, this formula will be used to pick the specific PORV from two possibilities in FIG. 9. We once again use the quasi-static momentum equation (19) for FIG. 9, where no pump is present, $$\Delta P = \Sigma k_i \rho \frac{v_i^2}{2}. \quad (20)$$

ANNs are trained to represent the PORV characteristics $f_a(P)$ and $f_b(P)$ for the two PORVs as a function of the pressure P. Upon opening of a PORV, the flow $W_s$ through the open unknown PORV is given by $$w_s = f_s(P_s)A_s, \quad (21)$$

where $P_s$ is the pressure at the PORV. To determine which PORV has inadvertently opened, i.e., failed, we compare the valve flow versus pressure response with $f_a(P)$, which assumes failure of PORV a, and $f_b(P)$, which assumes failure of PORV b. An ANN is used here as the equality is not a point equality, but a function of pressure. In other words, a comparison of shapes is once again performed here. An ANN topology has been developed to apply this formula. With the limitations in instrumentation indicated in FIG. 9, only the pressure $P_1$ and the flows $w_1$ and $w_2$ are known. Assuming that PORV "b" is the malfunctioning PORV, Eq. (15) can be used to relate $$P_b = P_1 - L_b w_1^2, \quad (22)$$

where $L_b$ is the loss coefficient determined by the location of PORV "". By mass conservation, $$w_s = w_1 - w_2. \quad (23)$$

Alternatively, if system inventory is available, through level measurements for example, Eq. (9) can be replaced with $$W_s = \frac{dM}{dt} \quad (24)$$

We now plot the valve flow $w_s$ obtained through Eqs. (23) or (24) to Eq. (21) with $P_s = P_b$ and $P_s = P_a$ defined in Eq. (22). Thus, through a trial-and-error selection process, the specific component classifier can decide whether PORV "a" or PORV "b" is the malfunctioning PORV. The formula then can be expanded to pick one PORV out of a set of n PORVs in series. It can be seen that here again this will be an iterative search process, with possibilities for optimization. Furthermore, it can be stated that this formula can generally be used to detect the malfunction of any component which is part of the inventory balance in the mass equation. As long as the characteristics f(P) are available for that component, there is theoretically no need to go through the generic component classifier for the $Q_{mass}$ components if all the data are available.

TEST PROBLEM

The methodology in the previous sections has been incorporated in a prototype diagnostic system for on-line process diagnosis. The diagnosis system is written in Prolog and consists of three distinct knowledge bases and an inference engine. The knowledge bases for estimating the macroscope imbalances in mass, momentum and energy and that describing the functional classification of components are based on physical principles and so are process-independent and are constructed once for analysis of any process. The third knowledge base, describing the process schematics, is created through a query session with the user that automatically generates Prolog procedures representing the process. This knowledge base is process-specific; however, it is isolated from the rest of the system and can be easily modified or reconstructed for different processes. The inference engine is also general and process-independent and consists of the diagnosis procedures of the previous section and rules for controlling the search.

To test the prototype diagnostic system, a test case representing the BOP for a LMR plant as illustrated in FIG. 1 has been selected. The BOP contains subcooled water with the exception of the shell side of all heaters and in the line beyond the saturation point inside the steam generator. The entire LMR plant, from the reactor core (not shown in FIG. 1) to the waterside condenser, is modeled with the SASSYS-1 system analysis code to simulate four malfunctions:

1. Reduction of the feedwater pump motor torque by 50%,
2. Closure of the feedwater check valve area to 10% of nominal,
3. Rupture of the piping connecting the tube side of heaters #1 and #2 at a constant rate of 30 kg/s, and
4. Rupture of the piping connecting the shell side of heaters #1 and #2 at an increasing rate of 0.2 kg/s.

All four process malfunctions are correctly hypothesized by the expert system within 11 s into the transient. In the first two cases, however, both feedwater check valve and pump are selected as possible faulty component candidates. This is due to the fact that the two components, valve and pump, are functionally classified as source or sink of momentum, and the failure of either one would cause the components of the tube-side loop, from the deaerator to the steam generator, to behave as a momentum sink. In this case, the trained neural networks at the second-level of the hierarchical structure are used to distinguish between the two faults and uniquely identify the malfunction as either a pump fault or as a valve fault. The last two events characterizing pipe ruptures in the tube and shell sides, respectively, are uniquely hypothesized by the expert system. A tube rupture causes the upstream components to behave as momentum sources while causing the downstream components to behave as momentum sinks. Hence, by classifying a pipe as a sink and source of momentum and knowing which components are behaving as sources of momentum and which are behaving as sinks of momentum, the type and location of the malfunction is uniquely determined.

QUALITATIVE ANALYSIS OF THE MACROSCOPIC BALANCE EQUATIONS

In the inventive approach for nuclear power plant diagnostics, the plant structure is visualized as a network of flow paths representing the various components of the plant. Each plant component is associated with a control volume characterized by lumped thermal-hydraulic and thermodynamic properties such as temperature, pressure, and mass flow rate, and is described by macroscopic mass, energy and momentum conservation equations. A component fault will cause the properties of the associated control volume to vary, which in turn will cause imbalances in the conservation equations. Here, the variations of pressure P and temperature T are related through the equations of state to the total inventories of mass M and energy U for a control volume V containing single-phase fluid, and the mass flow rate W is related to the total momentum inventory M of volume V through the definition of momentum, as set forth in Eqs. (1), (2) and (10) above.

A compact set of diagnostic rules relating the variations of pressure, temperature and mass flow rate to imbalances in macroscopic mass, energy and momentum can be obtained through a qualitative analysis of Eqs. (1), (2) and (10). The qualitative analysis approach consists of representing a large quantity space of a variable by a small quantity space. For instance, the large quantity space representing changes in the values of T, P and W is represented here by a small quantity space consisting of only three values (+, −, 0) representing the case when changes are positive, negative and zero, respectively. Although the transformation from quantitative to qualitative analysis allows the construction of a compact set of rules, some information is lost in the mapping process. This loss of information may cause ambiguities in certain circumstances which may be resolved only by providing additional information.

The expressions for the qualitative analysis of imbalances in M, U and M as a function of variations in P, T and W are obtained through a two-step transformation of Eqs. (1), (2) and (10). First, the associated differentials dM, dU and d$\underline{M}$ are obtained for a fixed control volume V. Then, the differentials are transformed into qualitative differential equations using DeKleer's methodology and notation as set forth in Eqs. (6) and (7), where the square brackets [•] represent the qualitative value (+, −, 0) of the argument, and the term PV in Eq. (2) has been neglected. Given the qualitative values (signs of the changes) of the differentials and partial derivatives of the right hand sides of the equations, diagnostic rules are obtained by applying the operations of qualitative algebra among the brackets. The values of [dT], [dP] and [dW] are readily available from the variations of T, P and W, respectively, and the qualitative values for the partial derivatives are obtained through analysis of the equation-of-state tables such as previously discussed Table I. Table I illustrates the qualitative values of the partial derivatives for single-phase (subcooled liquid and superheated steam) water. The approach is, however, general and is not limited to water properties.

Substituting the qualitative values of the partial derivatives of Table I into Eqs. (6) and (7) and applying the operations of qualitative algebra, we obtain expressions for the qualitative analysis of changes in mass and energy inventories, respectively. Those qualitative expressions are solely dependent on the observed values of [dT] and [dP] and are used to obtain the diagnostic rules. For instance, the qualitative expression that represents changes in the mass inventory, for subcooled liquid, is given by:

$$[dM]=[-]\bullet[dT]+[+]\bullet[dp]=-[dt]+[dp] \quad (25)$$

For a positive [dT] and a negative [dP] Eq. (25) yields a negative change in the mass inventory, $$[dM]=-[+]+[-]=[-]+[-]=[-].$$

which can be expressed as the following first-principles qualitative diagnostic rule characterizing a mass imbalance in a control volume:

if temperature is increasing and pressure is decreasing in a control volume containing single-phase fluid, then the total mass inventory of the control volume will decrease.

A summary of the qualitative analysis of the mass and energy inventories, for subcooled liquid and superheated steam, is presented in previously described Tables IV and V, respectively. The rows of the tables correspond to the nine possible combinations in the values of [dT] and [dP], which are represented in the first and second columns of the tables. The third and fourth columns correspond to the qualitative behavior of the mass in Table IV and energy inventories in Table V for subcooled liquid and superheated steam, respectively, as a function of the values of [dT] and [dP] of the associated row.

As mentioned earlier, the loss of information due to the use of a quantity space described by only three values can yield ambiguous results. For instance, the analysis of the mass inventory is ambiguous when [dT] and [dP] are both positive because the two terms of the right hand side of Eq. (25) have different signs and the net result depends on the relative magnitude of the two terms. For this specific case, parametric studies yield a negative change in the mass inventory as long as the module of dP/P is smaller than the module of 100 dT/T.

For the case of two-phase flow, the qualitative analysis of mass and energy inventories can be obtained, when the two phases are separable, as a function of the variation of the saturation pressure and liquid level. The analysis of momentum imbalances is directly obtained through Eq. (11). Momentum will increase in a control volume if the associated measured flow rate W is increasing, and it will decrease if W is decreasing.

Our approach for both fault detection and identification is based on the fact that a component fault affects the performance of the plant by causing imbalances of mass, energy and momentum in the process components. Fault detection, as described in the previous section, is obtained by mapping trends in pressure, temperature and flow into trends in the imbalances of the conservation equations. Fault identification is obtained by relating the detected imbalances with the function of the components. This is achieved through the generation of a library of component types, e.g., pipe, pump, electric heater, and functionally classifying them according to which of the three (mass, energy and momentum) conservation equations is most strongly affected when the component fails. For example, if we functionally classify a pipe as a source and sink of momentum, because a pipe failure primarily causes an imbalance in the momentum conservation equation, we could then relate a positive upstream and a negative downstream imbalance in the momentum conservation equation to a pipe failure.

The functional classification of the most common components present in a nuclear power plant is illustrated in Table VII. Each component type is classified as a source and/or sink of mass, energy and momentum. This abstract classification of components allows for the implicit representation of the failure modes of the components and addresses the issue of functional completeness of a diagnostic knowledge base. For instance, by classifying a valve as a source or sink of momentum, we are inherently accounting for the possible failure modes of the valve. A valve leakage, blockage, or unexpected closure are covered by the classification of the valve as a sink of momentum, since any one of these failures would cause a negative imbalance in the momentum conservation equation. An unexpected valve opening is covered by the classification of the valve as a source of momentum for analogous reasons. This method is in contrast with the event-oriented approach for diagnostics of pressurizer failures using macroscopic conservation equations, where every set of imbalances is explicitly associated with a component failure.

In addition to the functional classification of the components, the information describing the physical structure of the plant is also used in the identification of faults. This information, obtained from the plant schematics or piping and instrumentation diagrams, describes the structural arrangements of the plant components and is represented in a separate knowledge base. This knowledge base contains the only plant-dependent data of the proposed diagnosis methodology and is the only portion of knowledge that needs to be modified to accommodate changes in the plant or to diagnose component faults in another plant.

Detection and Diagnosis Procedure

In the following, we show how the methods for estimating macroscopic imbalances in the conservation equations, the functional classification of components, and the information about the plant schematics are combined to detect and identify faulty components in a nuclear power plant.

In essence, a component fault is detected and diagnosed through the four-step procedure described in FIG. 3. In step 1, the deviations of the monitored plant parameters (temperature, pressure and flow) from their expected values in each component are determined by violations of established thresholds. Next, based on the qualitative changes of the deviating plant parameters (e.g., positive [dT], negative [dW]) in each affected component and the physical state of the components (e.g., subcooled liquid, superheated steam) the rules of Table IV are used to characterize mass and energy imbalances in each one of the affected components. Momentum imbalances are characterized directly. The positive or negative imbalance directions characterize the behavior of each affected component as a source or sink, respectively, of mass, energy and momentum. In step 3, a set of possible faulty component types is obtained by matching the type (mass, energy or momentum) and direction (source or sink) of the characterized imbalances of the affected components against the functional classification of components in Table VII. Finally, faulty component candidates are identified by using the information of the plant schematics and matching the type of the affected components against the set of possible faulty component types obtained in step 3.

Power Plant Test Problem

The concepts presented in the foregoing sections have been synthesized in a prototype diagnostic system for on-line power plant diagnosis. The diagnosis system is written in Prolog and consists of an inference engine and three distinct knowledge bases representing the qualitative imbalances in the three conservation equations, the functional classification of components, and the plant schematics. With the exception of the plant schematics, the developed expert system is completely general and can be applied to diagnose plant component faults in different systems.

The plant configuration selected as a test case for the prototype diagnostic system is diagrammed in previously described FIG. 1. The balance of plant (BOP) design for a liquid metal reactor (LMR) plant contains subcooled water, with the exception of the shell-side of all heaters and in the line beyond the saturation point inside the steam generator. The entire LMR plant, from the reactor core (not shown in FIG. 1) to the water-side condenser, was modeled with the SASSYS-1 LMR systems analysis code to simulate four single-fault transients:

1. Reduction of the feedwater pump motor torque by 50%,
2. Closure of the feedwater check valve area to 10% of nominal,
3. Rupture of the piping connecting the tube side of heaters #1 and #2 at a constant rate of 30 kg/s, and
4. Rupture of the piping connecting the shell side of heaters #1 and #2 at an increasing rate of 0.2 kg/s.

Each transient was simulated for 80 s, starting from a steady-state 100% nominal power condition, including a 20 s null transient. The results of each one of the four simulated single-faults was stored in a separate data file, with the values of temperature, pressure and flow for the various components of the BOP sampled at 1 s intervals. The data files were then used to simulate on-line tests of the diagnostic system, which correctly identified the single-faults within a few seconds into the transient. The following describes the procedures used by the proposed approach to detect and identify the first transient, an unexpected 50% reduction of the feedwater pump motor torque.

Figure 4:
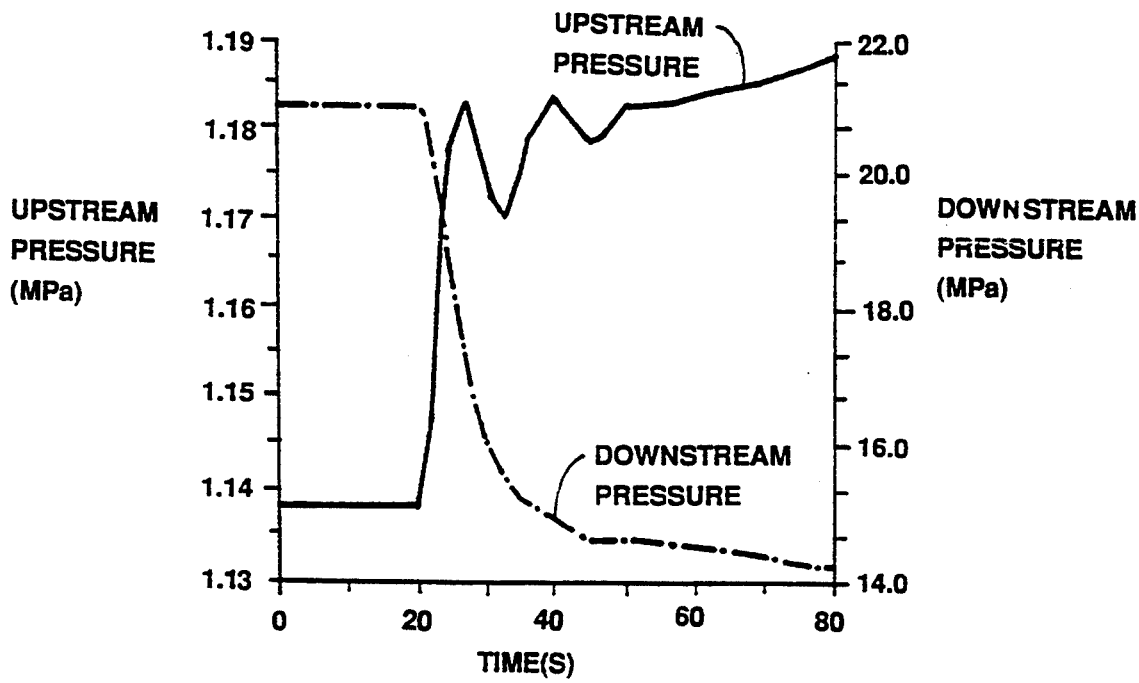
FIG. 4 is a graphic representation of the variation in pressure just upstream of a pump and downstream in the tube side of heater #1 in FIG. 1.
Figure 5:
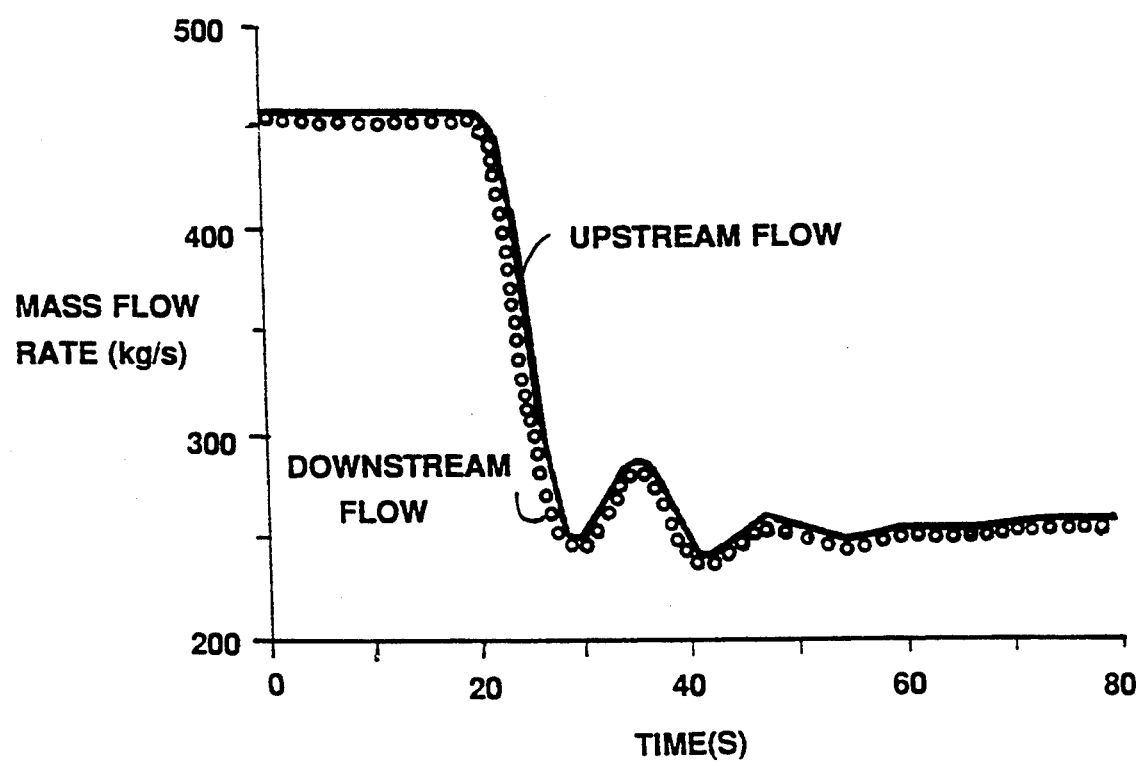
FIG. 5 is a graphic representation of the variation in flow in the piping connecting the deaerator to the pump and in the piping connecting the tube sides of heaters #1 and #2 in FIG. 1.

A feedwater pump motor torque causes a slight pressure increase in the upstream piping connecting the pump to the deaerator, a pressure decrease in the downstream components up to the steam generator, and an immediate decrease in the mass flow rate through the components between the deaerator and the steam generator control valve. FIG. 4 shows the variation in pressure just upstream of the pump, and downstream in the tube side of heater #1. FIG. 5 shows the variation in flow in the piping connecting the deaerator to the pump and in the piping connecting the tube sides of heaters #1 and #2. The deviations of both pressure and flow from the expected values, corresponding to step 1 of the detection/diagnosis procedure in FIG. 3, trigger the expert system. In step 2, the system makes a list of the affected components, which in this case includes components between the deaerator and the steam generator, and associated imbalances. These two time-dependent steps are illustrated in Table VIII at the onset of the transient. The first column of the table describes the affected components, while the second column shows the qualitative changes in the plant parameters for each one of the affected components. For example, at the onset of the transient the tube bundle in heater #1 is experiencing zero (0) temperature change dT, and negative (−) pressure dP, inlet flow $dW_{in}$, and outlet flow $dW_{out}$ changes. The last column in Table VIII shows a negative imbalance in momentum for all affected components. This imbalance is a consequence of a decrease in flow. Due to water incompressibility, a negative [dP] in the tube-side of heaters #1 and #2 does not cause imbalances in the mass or energy inventories in these components, as shown in row five in Table IV.

TABLE VIII

| Initial Effects of the Reduction of the Feedwater Pump Motor Torque by 50% | | | | | | | |
|---|---|---|---|---|---|---|---|
| Affected | Plant Parameter Trend | | | | Imbalance Type | | |
| Components | [dT] | [dP] | [dW$_{in}$] | [dW$_{out}$] | [dM] | [dU] | [dM] |
| Deaerator | 0 | 0 | 0 | — | | | — |
| Feedwater Pump | NA$^a$ | NA | — | — | | | — |
| Check Valve | NA | NA | — | — | | | — |
| Tube Heater 1 | 0 | — | — | — | | | — |
| Tube Heater 2 | 0 | — | — | — | | | — |
| Control | NA | NA | — | — | | | — |

TABLE VIII-continued

| Initial Effects of the Reduction of the Feedwater Pump Motor Torque by 50% | | | | | | | |
|---|---|---|---|---|---|---|---|
| Affected | Plant Parameter Trend | | | | Imbalance Type | | |
| Components | [dT] | [dP] | [dW$_{in}$] | [dW$_{out}$] | [dM] | [dU] | [dM] |
| Valve | | | | | | | |

*$^a$NA indicates data were not available.*

In step 3 of the detection/diagnosis procedure, the expert system searches the knowledge base representing the functional classification of the components (as described in Table VII), to identify a pump and a valve as two component types that could be responsible for the behavior of the affected components as momentum sinks, i.e., negative [dM]. Finally, by matching the identified component types, i.e., pump and valve, with the list of affected components the expert system flags the feedwater pump and the two valves as the possible faulty components. Detailed diagnosis, to distinguish between a pump and a valve failure, is then performed by the trained neural networks at the second-level of the two-level hierarchical diagnostic structure to uniquely identify the feedwater pump as the faulty component.

The uniqueness of the proposed method to perform both system- and component-level diagnostics during incipient off-normal operations of power plants relies on the combined use of mass, energy and momentum conservation concepts in the ES with trained neural networks. This unique combination allows for the construction of a compact, yet robust plant-independent diagnosis system. Once a component type has been classified, the same rule used to classify the component can be used to detect the failure of that component type anywhere in the system or in any other system. In addition, there is no need for the ES to tackle the impossible task of formulating all possible events or combination of events, as is required in event-oriented approaches.

The present invention provides a powerful and effective approach for incorporating basic first-principles into the knowledge base of a general process diagnosis system. The methodology identifies faulty component candidates (through the ES) which can then be singled out with deep-knowledge reasoning (through the ANNs). The use of basic physical principles produces a small, general and comprehensive set of diagnostic rules and methods which are physically correct. The generality of this approach is achieved through the clear separation of the process-dependent schematics representation and ANN formulation from the remaining process-independent knowledge bases and inference engine. These factors produce a robust process diagnosis methodology which can be effectively verified and validated through standard techniques.

AI techniques in the form of knowledge-based ESs have been proposed to provide on-line analysis and decision-making support for process plant operators during both normal and emergency conditions. In spite of the great interest in these advanced techniques, their application in the diagnosis of large-scale processes has not reached its full potential because of limitations of the knowledge base. These limitations include problems with knowledge acquisition, lack of flexibility, and the use of an event-oriented approach for process diagnosis. The present invention employs the combination of physical principles and ANNs to systematically construct a hybrid two-level hierarchical knowledge structure for an AI-based diagnostic system. This approach addresses outstanding issues in the use of AI techniques to diagnose processes in a realistic environment; being able to be comprehensively verified and validated, being flexible enough to diagnose an unforseen event, and being capable of handling data noise and limited or faulty instrumentation.

At the first hierarchical level of the two-level diagnostic procedure, the overall process is visualized as a network of flow paths representing the various components of the process. Each plant component is associated with a control volume characterized by lumped thermal-hydraulic and thermodynamic properties such as temperature and pressure, and obeys the macroscopic conservation equations of mass, momentum, and energy. A component fault causes the properties of the associated and surrounding control volumes to vary, which, in turn, will cause imbalances in the conservation equations. Through the characterization of the imbalances in the plant components, faulty components can be hypothesized by relating the detected imbalances with the function of the components. At this level, effort is focused on the characterization of macroscopic mass, momentum, and energy imbalances and on the functional classification of components. After the first level of the two-level hierarchical diagnostic procedure has narrowed down the possible process faults to a few components, the second level narrows the diagnostic focus even further and uniquely identifies the initiating fault by using detailed knowledge about the process components. The detailed knowledge consists of characteristic T-H relationships for each component of the process. It would be difficult, if not impossible, to code these characteristic relationships for each component into the ES as a set of complex diagnostic rules. Instead, in this invention we propose to apply ANNs to represent detailed component knowledge. Neural networks are used to systematically map the relationships between component driving T-H parameters (the cause) and component responding T-H parameters (the effect). They are robust enough to handle data noise and an incomplete set of symptoms, and have the potential to generalize their knowledge to successfully diagnose novel fault situations. The potential additional capabilities of ANNs over other approaches resides in the architecture of the neural nets. In addition to input and output layers corresponding to causes and effects, respectively, ANNs have intermediate or hidden layers. The hidden layers enable the development of internal representations which allow the system to generalize possible effects (the output) given a novel set of causes (the input).

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. A method for diagnosing failures in the operation of a thermal-hydraulic system including detection of a malfunctioning component in said thermal-hydraulic system, said method comprising the steps of:

classifying a malfunction of the component by a function performed by the component as a mass source/sink, or a momentum source/sink, or an energy source/sink imbalance including the steps of:

assigning to one or more of the components of the thermal-hydraulic system a thermal-hydraulic control volume which characterizes the total mass, momentum, and energy inventories of said one or more components during normal and off-normal operations;

assigning to each thermal-hydraulic control volume its associated mass, momentum, and energy conservation equations;

assigning to one or more components a functional classification as a source or sink of mass, momentum, or energy;

assigning components to generic component classes by said functional classification;

monitoring operation of the thermal-hydraulic control volumes for detecting an imbalance in the total mass, momentum, or energy inventories in any of the thermal-hydraulic control volumes; and comparing a detected imbalance in mass, momentum, or energy inventories of the thermal-hydraulic control volumes with the conservation equations and the functional classification for each of the components and identifying a given component as faulty when a detected imbalance in mass, momentum, or energy of the thermal-hydraulic control volume matches the classification of the component as a source or sink of mass, momentum, or energy;

classifying the function as one of a plurality of generic component classes for each of said mass, momentum and energy source/sink imbalances; and classifying a specific component within one of said generic component classes as said malfunctioning component.

2. The method of claim 1 wherein the control volume imbalances in mass, momentum and energy inventories are determined from trends in the associated thermal-hydraulic and thermodynamic properties such as temperature and pressure through equations of state.

3. The method of claim 1 wherein the step of classifying the malfunction of the component by a function performed by the component includes associating each system component with a designated control volume characterized by associated thermal-hydraulic and thermodynamic properties such as temperature and pressure.

4. The method of claim 3 wherein a component malfunction causes properties of associated and surrounding control volumes to vary causing imbalances of mass, momentum and energy inventories.

5. The method of claim 4 wherein the step of classifying the malfunction of a component by a function performed by the component further includes determining imbalances in mass, momentum and energy sources or sinks from imbalances in mass, momentum and energy inventories through application of the macroscopic conservation equations of mass, momentum, and energy.

6. The method of claim 5 further comprising the step of designating faulty components by relating said imbalances of mass, momentum and energy sources or sinks in said conservation equations with a function of a plurality of generic components.

7. The method of claim 1 wherein the step of classifying the function as one of a plurality of generic component classes for each of said mass, momentum and energy source/sink imbalances includes classifying the function by generic component thermal-hydraulic characteristics.

8. The method of claim 7 wherein the step of classifying the function further as one of a plurality of generic component classes for said momentum source/sink imbalance includes the step of classifying the function as active such as that of pumps, or passive such as that of open valves.

9. The method of claim 8 wherein the step of classifying the function further as one of a plurality of generic component classes for said momentum source/sink imbalances for a pump includes determining and using pump head flow characteristics.

10. The method of claim 8 wherein the step of classifying the function further as one of a plurality of generic component classes for said momentum source/sink imbalance for a valve includes determining and using valve flow head loss characteristics.

11. The method of claim 1 wherein the step of classifying the specific component within one of said generic component classes as said malfunctioning component includes classifying the specific component by specific component thermal hydraulic characteristics.

12. The method of claim 11 wherein the step of classifying a specific power operated relief valve within one of said generic component classes for mass source/sink imbalances as said malfunctioning component includes determining and using power operated relief valve pressure flow characteristics.

13. The method of claim 1 wherein the step of classifying the malfunction of the component by a function performed by the component as a mass source/sink, or a momentum source/sink, or an energy source/sink imbalance includes utilizing an expert system in identifying the imbalance with a plurality of generic components.

14. The method of claim 1 wherein the steps of classifying the function as one of a plurality of generic component classes and classifying a specific component within one of a plurality of generic component classes includes utilizing artificial neural networks in differentiating between classes of generic components and between individual components within a given class.

* * * * *

UNITED STATES PATENT AND TRADEMARK OFFICE
CERTIFICATE OF CORRECTION

PATENT NO. : 5,442,555
DATED : August 15, 1995
INVENTOR(S) : Jaques Reifman and Thomas Wei It is certified that error appears in the above-indentified patent and that said Letters Patent is hereby corrected as shown below:

On title page, at [73], delete "Argonne National Laboratory, Argonne, ILL" as assignee and insert --University of Chicago, Chicago, Illinois--.

Signed and Sealed this

Seventeenth Day of September, 1996

Attest:

BRUCE LEHMAN

*Attesting Officer*  *Commissioner of Patents and Trademarks*